United States Patent
Yang et al.

(10) Patent No.: US 8,208,529 B2
(45) Date of Patent: Jun. 26, 2012

(54) EQUALIZATION APPARATUS AND METHOD OF COMPENSATING DISTORTED SIGNAL AND DATA RECEIVING APPARATUS

(75) Inventors: Choong-reol Yang, Daejeon-si (KR); Je-soo Ko, Daejeon-si (KR)

(73) Assignee: Electronics and Telecommunications Research Institute (KR)

( * ) Notice: Subject to any disclaimer, the term of this patent is extended or adjusted under 35 U.S.C. 154(b) by 316 days.

(21) Appl. No.: 12/615,127

(22) Filed: Nov. 9, 2009

(65) Prior Publication Data
US 2010/0158096 A1  Jun. 24, 2010

(30) Foreign Application Priority Data
Dec. 22, 2008  (KR) .................. 10-2008-0131651

(51) Int. Cl.
*H03H 7/30* (2006.01)
*H03H 7/40* (2006.01)
*H03K 5/159* (2006.01)

(52) U.S. Cl. ........ 375/233; 375/232; 375/234; 375/350; 375/346; 375/231; 708/322; 708/323

(58) Field of Classification Search .......... 375/231–235, 375/350, 346; 708/322, 323
See application file for complete search history.

(56) References Cited

U.S. PATENT DOCUMENTS

| | | | |
|---|---|---|---|
| 6,912,250 B1 * | 6/2005 | Adireddy et al. | ............. 375/232 |
| 7,257,181 B2 | 8/2007 | Jones et al. | |
| 2007/0133722 A1 | 6/2007 | Agazzi et al. | |

FOREIGN PATENT DOCUMENTS

| | | |
|---|---|---|
| KR | 1020030043795 A | 6/2003 |
| KR | 10-2004-0073126 | 8/2004 |
| WO | WO 01/93439 A1 | 12/2001 |

\* cited by examiner

*Primary Examiner* — Phuong Phu (74) *Attorney, Agent, or Firm* — Blakely, Sokoloff, Taylor & Zafman (57) ABSTRACT

Provided are an equalization apparatus and method of compensating a distorted received signal. The equalization apparatus includes: a filter unit removing inter-symbol interference (ISI) from a multi-channel signal that is received; and a zero-offset controller identifying a zero offset of the multi-channel signal and determining operating coefficients of the filter unit by reflecting the identified zero offset. A response filter, which reduces loss and noise, can be used, and the structure of the response filter can be simplified. In addition, channel characteristics are estimated in real time at an initial stage of data transmission and reception. Thus, an equalizer optimized for channel interference characteristics can be provided.

11 Claims, 5 Drawing Sheets

EQUALIZATION APPARATUS AND METHOD OF COMPENSATING DISTORTED SIGNAL AND DATA RECEIVING APPARATUS

CROSS-REFERENCE TO RELATED APPLICATION

This application claims the benefit under 35 U.S.C. §119(a) of Korean Patent Application No. 10-2008-0131651, filed on Dec. 22, 2008, the disclosure of which is incorporated by reference in its entirety for all purposes.

BACKGROUND

1. Field

The following description relates to optical Ethernet transmission technology, and more particularly, to an equalization apparatus and method of compensating a distorted signal received through a serial data link.

2. Description of the Related Art

The growing demand for multimedia data communication is resulting in network equipment that can transmit data at several tens of gigabits per second (Gb/s). Data received by a multimedia data receiving apparatus contains various kinds of noise.

According to the Institute of Electrical and Electronic Engineers (IEEE) 802.3ba standard, ultra-high-speed data communication systems should transmit data using a multi-channel method. For example, 40 G of data should be transmitted using four 10 Gb/s lines (channels).

For high-speed multimedia data transmission, a cable-based high-speed serial transmission method is far more advantageous than a conventional bus-based parallel transmission method, in terms of system performance and cost.

Meanwhile, the increase in data transmission speed is creating problems such as signal loss and crosstalk (e.g., near-end crosstalk loss (NEXT) and far-end crosstalk loss (FEXT)) in a system backplane. To solve these problems, channel performance must be improved, which can be achieved by correcting the amplification of a signal or the modification of the signal, which occurs in the process of transmitting the signal, at the data transmitting or receiving end.

Specifically, inter-symbol interference (ISI) in a communication channel stems from channel impedance discontinuities, linear amplification, and phase distortion. Since ISI affects other adjacent channels, it must be minimized. To remove ISI, a maximum likelihood sequence detector (MSLD) or an equalizer is being used.

SUMMARY

The following description relates to an equalization apparatus and method which can reduce the number of taps of a filter, the amount of computation required, and the propagation effect of decision error by providing a method of designing a response filter.

The following description also relates to an equalization apparatus which can prevent accumulation of return, crosstalk, and channel damage and, in the case of multi-channel communication, prevent performance degradation caused by loss and interference between adjacent channels when data is transmitted (after being divided) or received (after being combined) using a backplane channel having multiple lanes for an ultra-high-speed data link.

According to an exemplary aspect, there is provided an equalization apparatus for compensating a distorted received signal. The apparatus includes: a filter unit removing inter-symbol interference (ISI) from a multi-channel signal that is received; and a zero-offset controller identifying a zero offset of the multi-channel signal and determining operating coefficients of the filter unit by reflecting the identified zero offset.

According to another exemplary aspect, there is provided a data receiving apparatus including: a backplane channel receiving a multi-channel signal; and a multi-channel equalizer including a filter unit which removes ISI from the multi-channel signal received from the backplane channel and a zero-offset controller which identifies a zero offset of the multi-channel signal and determines operating coefficients of the filter unit by reflecting the identified zero offset.

According to another exemplary aspect, there is provided an equalization method of compensating a distorted received signal. The method includes: identifying a zero offset of a multi-channel signal that is received; determining operating coefficients by reflecting the identified zero offset; and equalizing the multi-channel signal based on the determined operating coefficients to remove ISI from the multi-channel signal.

Other objects, features and advantages will be apparent from the following description, the drawings, and the claims.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain aspects of the invention.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 1:
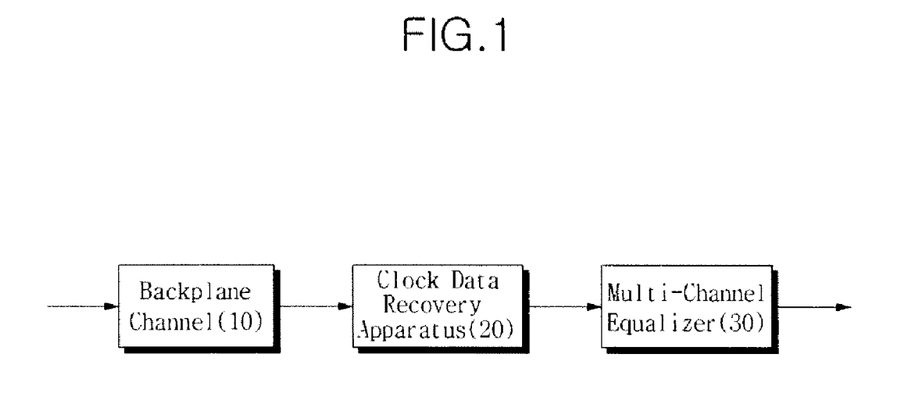
FIG. 1 is a block diagram of a data receiving apparatus according to an exemplary embodiment of the present invention.

FIG. 1 is a block diagram of a data receiving apparatus according to an exemplary embodiment of the present invention.

Referring to FIG. 1, a multi-channel signal input to a backplane channel 10 has larger noise components, such as crosstalk loss (near-end crosstalk loss (NEXT) and far-end crosstalk loss (FEXT)) and return loss between adjacent channels, than a signal-channel signal input to the backplane channel 10.

Therefore, noise components, which may accumulate in a multi-channel signal, must be removed at a receiving end to reduce decision error probability and increase the accuracy of channel estimation. A clock data recovery (CDR) apparatus 20 is installed before or after a multi-channel equalizer 30 to recover clock data. A signal output from the multi-channel equalizer 30 is transmitted to a channel decoder.

Figure 2:
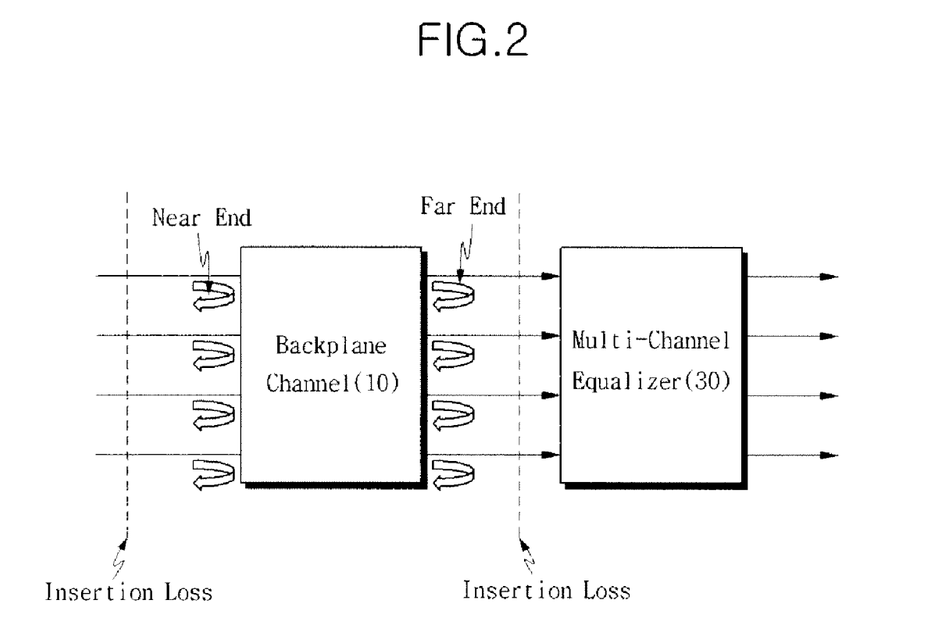
FIG. 2 illustrates crosstalk in a communication receiving apparatus including a backplane channel according to an exemplary embodiment.

FIG. 2 illustrates crosstalk in a communication receiving apparatus including a backplane channel 10 according to an exemplary embodiment.

Referring to FIG. 2, when a signal transmitted over a communication network passes through the backplane channel 10 in a high-speed data communication system, insertion loss, return loss, and crosstalk accumulate between a plurality of channels within the backplane channel 10. Thus, a multi-channel equalizer 30 should be installed at a receiving end to effectively remove these effects and thus improve performance of the signal.

The multi-channel equalizer 30 must have a design allowing it to be superior over a conventional equalizer such as a decision feedback equalizer (DFE) or a maximum likelihood sequence estimation (MLSE) equalizer in terms of power consumption, complexity, and bit error rate (BER).

In data transmission and reception, a transmitted signal is distorted by a channel and thus inter-symbol interference (ISI) is caused. Hence, a receiver must compensate a distorted, received signal using an equalizer in order to determine whether the received signal is the correct signal.

In a high-speed (more than 10 gigabits per second (Gb/s)) data communication environment such as an Ethernet network, a DFE, which is a nonlinear equalizer, is widely used to remove ISI from a received signal that was severely distorted by a channel.

The DFE compensates a signal severely distorted by a channel and includes a feed-forward filter (FFF) and a feedback filter (FBF). The FFF removes precursor ISI components, and the FBF removes postcursor ISI components. That is, the FBF removes ISI caused by previously decided signals from a current symbol, and the FFF removes ISI caused by signals before being decided from the current symbol.

The FBF removes the postcursor ISI components remaining in a signal, which passed through the FFF, by using previously received symbols. To remove the precursor ISI components and the postcursor components, the FBF is required. When a large number of taps of the FBF are used, a large amount of computation is required for the FBF. That is, the amount of computation required for the FBF increases in proportion to the number of taps of the FBF. In addition, the time required to converge coefficients of the DFE to appropriate values and the propagation of decision error increases. Accordingly, this has led to a demand for a method of effectively reducing channel response so as to reduce the number of taps of the FBF, thereby reducing the amount of computation required and the propagation of decision error.

When decision error rate of DEF is low enough, a decided symbol does not contain noise components. Therefore, the DFE can have an appropriate channel adaptation speed and a superior BER, and ISI can be significantly removed.

Generally, an equalizer has two modes of operations. One is a tracking mode, and the other is a decision-directed mode. In the tracking mode, a transmitter sends a preset training sequence, and the equalizer receives the training sequence and initializes its tap coefficients. When the tap coefficients converge, the equalizer switches to the decision-directed mode. Then, the equalizer compensates remaining errors in a channel by using decided data instead of the training sequence. The tap coefficients of the equalizer may be adjusted to values that enable the equalizer to adapt to a channel, according to characteristics of the channel and by using an algorithm.

The FFF is a linear filter and implemented as a finite impulse response (FIR) filter or a tapped delay line (TDL) filter. The FFF has a tap space of T/2=50 ps for a 10 gigabit (G) link.

The DFE is a nonlinear equalizer that removes ISI on demodulated pulses. The DFE, which is one type of equalizer, operates on noiseless quantized levels, and thus its output is almost free of channel noise.

Specifically, the DFE may remove ISI, which has previously been introduced, from a current signal by using data values decided one period ago and two periods ago provided by a feedback loop. The voltage of signal having ISI removed by the DFE may be defined by $$Y(nT)=V_{in}(nT)-a1\cdot \hat{Y}(n-1)-a2\cdot \hat{Y}(n-2)$$

where a1 and a2 are equalizer coefficients representing ISI that needs to be removed, Vin(nT) is a signal input to a receiving end, and Y(nT) is an output voltage, which has ISI removed, and which is output from an equalizer. Coefficients of an equalizer may vary according to channel characteristics and chip characteristics. Thus, the coefficients of the equalizer should be determined by taking these factors into consideration.

An equalizer, which receives data from a wired channel, should have a transfer function as the one shown below in order to reduce channel distortion. In addition, the equalizer should be able to operate adaptively according to characteristics and length of the channel.

A transfer function of a backplane printed circuit board (PCB) pattern is defined by $$H(s)=\exp(-La\sqrt{s}),$$

where L is a length of a channel, and "a" is a characteristic constant of the channel. That is, the length and width of the backplane PCB pattern and a value of the characteristic constant determine channel characteristics for overcoming loss or noise. An adaptive equalizer changes its coefficients according to a signal input to a receiver. When the coefficients of the adaptive equalizer converge to appropriate values, the error becomes almost zero.

The present invention provides a method for compensating a distorted signal received through a channel by a data receiving apparatus including an equalization apparatus. In addition, the present invention provides an equalization apparatus which is designed to reduce losses existing in a backplane channel while data is being delivered to a system, thereby minimizing an existing offset error and noise power loss.

Figure 3:
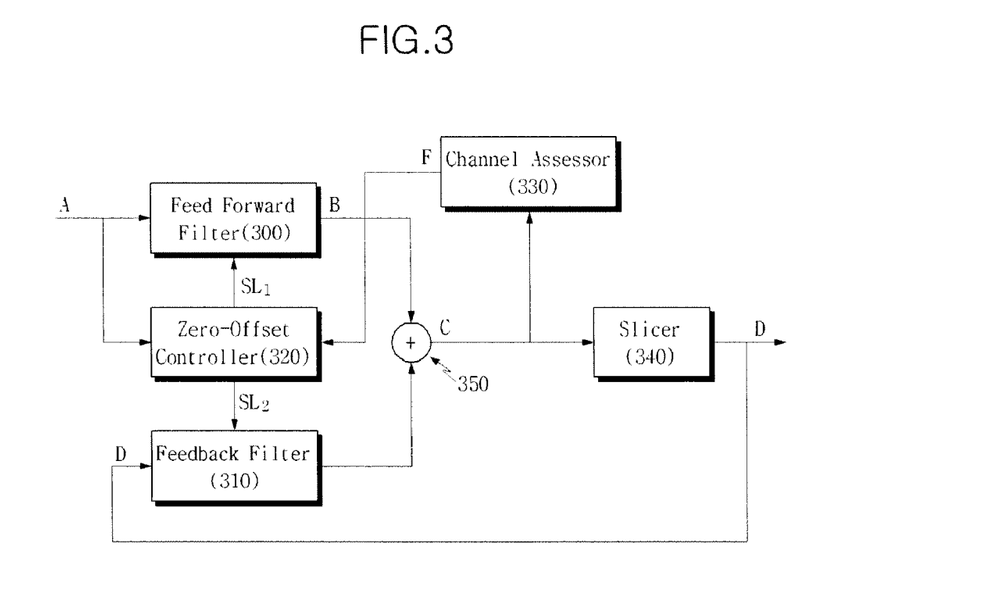
FIG. 3 is a block diagram of an equalization apparatus according to an exemplary embodiment.

FIG. 3 is a block diagram of an equalization apparatus according to an exemplary embodiment.

The equalization apparatus according to the current exemplary embodiment is a multi-channel equalizer and basically takes the form of a DFE. The equalization apparatus according to the current exemplary embodiment compensates for low-pass and dispersion characteristics in cable and fiber communication channels in a multi Gb/s link.

In addition, a programmable multi-channel equalizer may be used as the equalization apparatus according to the current exemplary embodiment in order to compensate for frequency-dependent loss of a backplane channel and in order for easy data recovery. Referring to FIG. 3, the equalization apparatus according to the current exemplary embodiment includes an FFF 300, an FBF 310, a zero-offset controller 320, a channel assessor 330, and a slicer 340.

The equalization apparatus according to the current exemplary embodiment includes three filters, that is, the FFF 300, the FBF 310, and the channel assessor 330.

The FFF 300 is set according to calculated coefficients. Here, filter coefficients and equalizer coefficients may be set such that the BER is minimized. An adder 350 subtracts a signal, output from the FFF 300, from a feedback signal, output from the FBF 310, and outputs the subtraction result to the slicer 340. The slicer 340 is a decision-making circuit. In the current exemplary embodiment, the slicer 340 may be implemented as a Schmidt trigger circuit.

Data output from the slicer 340 is provided to a channel decoder and thus is additionally processed by the channel decoder.

A signal B output from the FFF 300 and a signal E output from the FBF 310 pass through the adder 350 and are output from the adder 350 as a signal C. The slicer 340 generates a signal D from the signal C. Also, the slicer 340 generates an error function based on the difference between a value of the signal C input to the slicer 340 and a value of the signal D output from the slicer 340 and sends the generated error function to the channel assessor 330. The error function sent to the channel assessor 330 is delivered to the zero-offset controller 320. The signal C is decided by the slicer 340 and then fed back to the FBF 310 in order to remove interference between currently input signals and improve adaptation performance.

The zero-offset controller 320 sets coefficients of the FFF 300 using a control signal $SL_1$ and sets coefficients of the FBF 310 using a control signal $SL_2$. The equalization apparatus according to the current exemplary embodiment receives a signal A through an internal data line and equalizes the signal A to set filter coefficients and equalizer coefficients.

An order of the FFF 300 is "N" and is managed by the hardware structure thereof.

In the current exemplary embodiment, the signal A input to the equalization apparatus may be defined by $$A = \sum_{i=0}^{L} h_i S_{K-i+nk},$$

where L is the order of a modeled transmission channel filter, $h_i$ is a coefficient of the modeled transmission channel filter, $S_k$ is a transmitted signal symbol, and $n_k$ is noise.

Total filter coefficients of the FFF 300 having an order of "N" may be given by $$FFF = \sum_{i=0}^{N} P_i E X_{k-1},$$

where Pi is a coefficient of the FFF 300 having "i" taps, and $X_{k-1}$ is a received signal.

The FBF 310 receives a signal decided by the slicer 340 and filters the received signal. The FBF 310 may be given by $$FBF = \sum_{i=1}^{L} g_i E S_{k-n-i},$$

where $g_i$ is a coefficient of the FBF 310, $S_{k-n}$ is an output of the channel assessor 330, and L is an order of the FBF 310.

The signal E output from the FBF 310 is the sum of the signal D output from the slicer 340 and the control signal $SL_2$ output from the zero-offset controller 320.

The signal C input to the slicer 340 has a value obtained by subtracting the coefficients of the FBF 310 from the coefficients of the FFF 300. The signal C input to the slicer 340 is matched with a transmission signal sequence $S_{k-n}$. Therefore, a discrepancy equal to the difference between the transmission signal sequence $S_{k-n}$ and the signal C occurs in the slicer 340.

An offset error F output from the channel assessor 330 is the difference between the signal C input to the slicer 340 and the signal D output from the slicer 340. The offset vector F output from the channel assessor 330 is defined by $$\dot{F}^{(j+1)} = \dot{F}^{(j+1)} + \rho F$$

where p is the size of an algorithm step.

The zero-offset controller 320 obtains reference voltage information from the signal A and receives an error function of estimated channel parameters from the channel assessor 330. Then, the zero-offset controller 320 subtracts a reference voltage value, which is to be provided to the FFF 300 and the FBF 310, from the error function, thereby quickly minimizing an offset error. By repeating this process, the reference voltage value of the signal A can be maintained at a minimum value.

The coefficients of the FFF 300 and the FBF 310 included in the DFE may be repeatedly adapted using an adaptive algorithm such as least mean square (LMS).

A signal input to an equalizer through a channel path contains channel impulse response (CIR) (including a physical multi-channel path, a transmitter filter, and a receiver filter), total channel length, crosstalk, insertion loss, return loss, and white noise.

That is, the signal input to the equalizer may be defined by $$r_n = \sum_{k=0}^{n_c-1} x_{n-k} h_k + L_n - W_n,$$

where $r_n$ is a received signal that was sampled at a time nT, and $x_n$ is a transmitted signal that was sampled at the time nT. In addition, $h_k$ is CIR including a physical channel path, a transmitter filter and a receiver filter, $n_c$ is a total channel length, and $L_n$ are crosstalk, insertion loss, and return loss. White noise Wn is removed from a channel input.

The signal C input to the slicer 340 is a set of the FFF 300 and the FBF 310 having coefficients that match a transmission signal sequence.

The coefficients of the FFF 300 and the FBF 310 are calculated such that transmission is signal CIR coefficients and signal-to-noise ratio (SNR) are minimized.

The FFF 300 receives the signal A through the channel. In the current exemplary embodiment, the FFF 300 processes the signal A such that the signal A can be equalized, thereby compensating for channel distortion. In the DFE structure, the FFF 300 to which an input signal is input and the FBF 310 to which a decided signal is fed back are required. In order to reduce unwanted channel effects such as ISI, the coefficients of the FFF 300 must be determined. Here, the coefficients of the FFF 300 must be determined such that error propagation and unwanted noise increase by the DFE are minimized and that channel effects are reduced to minimize signal distortion by the channel.

The signal B output from the FFF 300 is provided to the adder 350. The adder 350 subtracts the signal E received from the FBF 310 from the signal B, output from the FFF 300. Consequently, ISI and correlated noise can be removed from the signal B.

Figure 4:
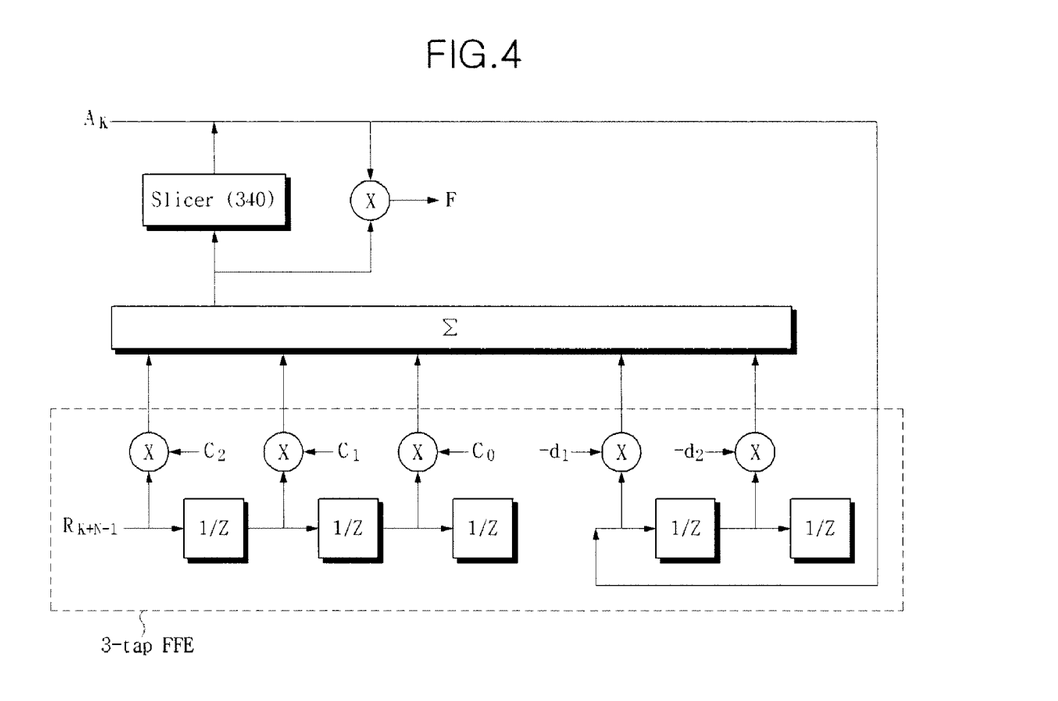
FIG. 4 is a block diagram illustrating filter configuration in more detail according to an exemplary embodiment.

FIG. 4 is a block diagram illustrating filter configuration in more detail according to an exemplary embodiment.

A feedback circuit, which feeds back a decision value of a detected symbol to remove ISI, is provided. An error output value F selects tap coefficients. In the current exemplary embodiment, a three finite impulse response (FIR) filter structure having three FFFs, for example, may be implemented.

In the FFF structure illustrated in FIG. 4, multipliers C0 through C2 may be replaced by lookup tables. Accordingly, all possible combinations of most recently received bits may be generated, and an adaptive operation may be repeatedly performed using FFF coefficients and the lookup tables. In so doing, gain control may be obtained.

A signal output from the slicer 340 may include a transfer function to remove noise from a received input signal. The zero-offset controller 320 removes an offset using an error signal of input and output signals of the DFE. In addition, the zero-offset controller 320 estimates a channel by generating tap coefficients. Here, the zero-offset controller 320 may estimate the channel by updating tap coefficients using a channel estimation algorithm.

When the error rate is low enough, a decided symbol hardly includes noise components. Therefore, the DFE can have a higher channel adaptation speed and a significantly lower BER, and ISI can be dramatically reduced.

A channel estimator included in the FFF 300 receives an input signal, estimates a channel using a correlated algorithm, and removes noise from the estimated channel. Then, the channel estimator selects a reference tap from the estimated channel.

The zero-offset controller 320 receives a signal from a channel, assesses the received signal, and determines coefficients of the FFF 300 and the FBF 310. The zero-offset controller 320 sets the coefficients of the FFF 300 using the control signal $SL_1$ and sets the coefficients of the FBF 310 using the control signal $SL_2$.

Figure 5:
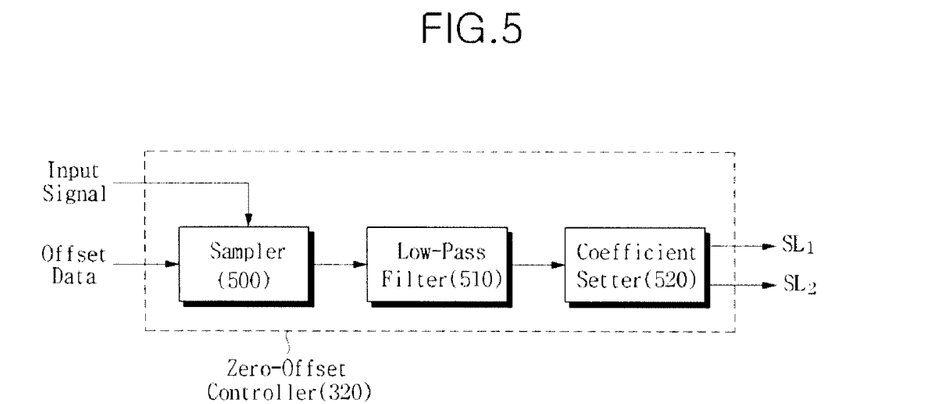
FIG. 5 is a block diagram of a zero-offset controller shown in FIG. 3.

FIG. 5 is a block diagram of the zero-offset controller 320 shown in FIG. 3.

Referring to FIG. 5, the zero-offset controller 320 includes a sampler 500, a low-pass filter (LPF) 510, and a coefficient setter 520.

The sampler 500 receives a signal through a backplane channel and offset data and samples the received signal and the offset data. In the current exemplary embodiment, when no signal is received, the sampler 500 samples noise components existing in the channel, such as crosstalk noise, return loss, insertion loss, and additive white Gaussian noise (AWGN). An offset reference value may be set based on sampled values obtained as a result of the above sampling operation. The offset reference value may be compensated by the LPF 510. The LPF 510 reduces high-frequency leaf components, which are in the form of a ripple which is overlain on a near direct current form, and out-of-band components of an input signal. Then, the LPF 510 amplifies its gain to an appropriate level.

When a signal is received from an external transmission channel, the coefficient setter 520 estimates normal signal components, which exclude a set offset reference value, based on the received signal. Accordingly, the coefficient setter 520 sets the coefficients of the FFF 300 and the FBF 310. The coefficient setter 520 transmits calculated coefficients to the FFF 300 and the FBF 310 using the control signals $SL_1$ and $SL_2$, respectively.

In the current exemplary embodiment, the zero-offset controller 320 further includes a detector to output a sequence internally generated by a clock into a digital value. Data converted into digital form is continuously recorded on an internal memory, and the level of an initially received signal is compared with that of a subsequently received signal so that an operating point can be maintained near a zero point of the signal.

The accuracy of estimating a channel using a correlated algorithm and setting filter coefficients is undermined by correlated noise. Therefore, instead of continuously providing training symbols until the training symbols converge to a channel, noise components and normal components are estimated based on a data signal of the channel according to whether data exists. Then, a zero-offset level is compensated for a subsequently received signal, that is, real data. Thus, a noise filtering function excellently adaptable to a communication environment can be performed. That is, the accuracy of channel estimation can be enhanced, channel convergence can be performed faster, and channel tap coefficients for convergence can be minimized.

Figure 6:
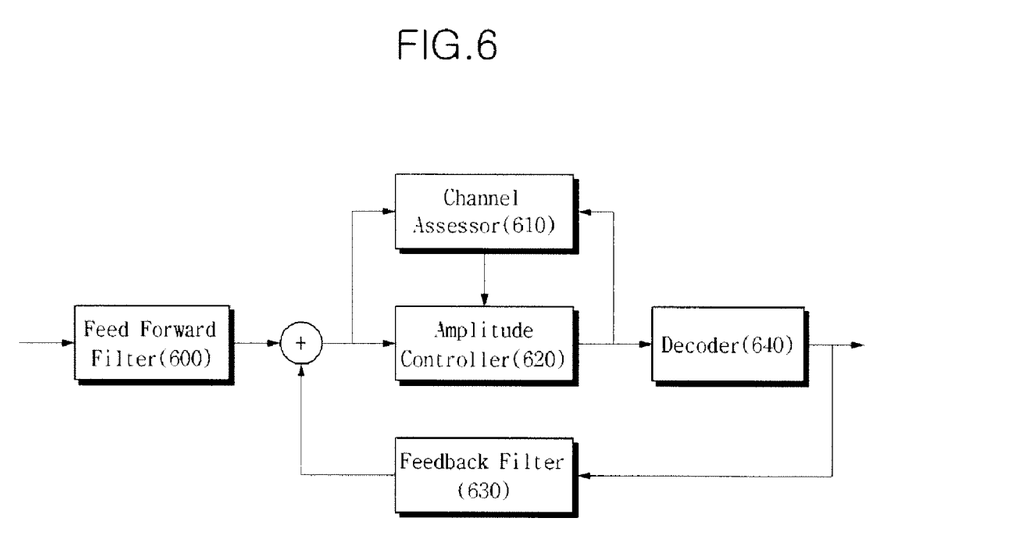
FIG. 6 is a block diagram of an equalization apparatus according to another exemplary embodiment.

FIG. 6 is a block diagram of an equalization apparatus according to another exemplary embodiment.

Referring to FIG. 6, the equalization apparatus according to the current exemplary embodiment comprises a nonlinear equalizer and a multi-channel equalizer that is a mixture of a DFE and an MLSE equalizer.

The equalization apparatus according to the current exemplary embodiment can control amplifier gain using transfer function characteristics of a channel. Characteristics of input and output signals of a channel assessor 610 are compared to determine an adaptive algorithm, and amplification characteristics of a filter are controlled using the determined adaptive algorithm, thereby performing a convergence process.

The performance of an FFF 600 depends on the structure thereof and a feedback structure that determines amplifier gain. A user may program the number of taps and set performance related to power consumption. In addition, FFF coefficients may be repeatedly adapted using an algorithm.

An amplitude controller 620 has a high gain value and controls the amplitude of an output signal thereof. A signal output from the amplitude controller 620 may be fed back to the channel assessor 610 or fed back to an FBF 630 after being decoded by a decoder 640.

Figure 7:
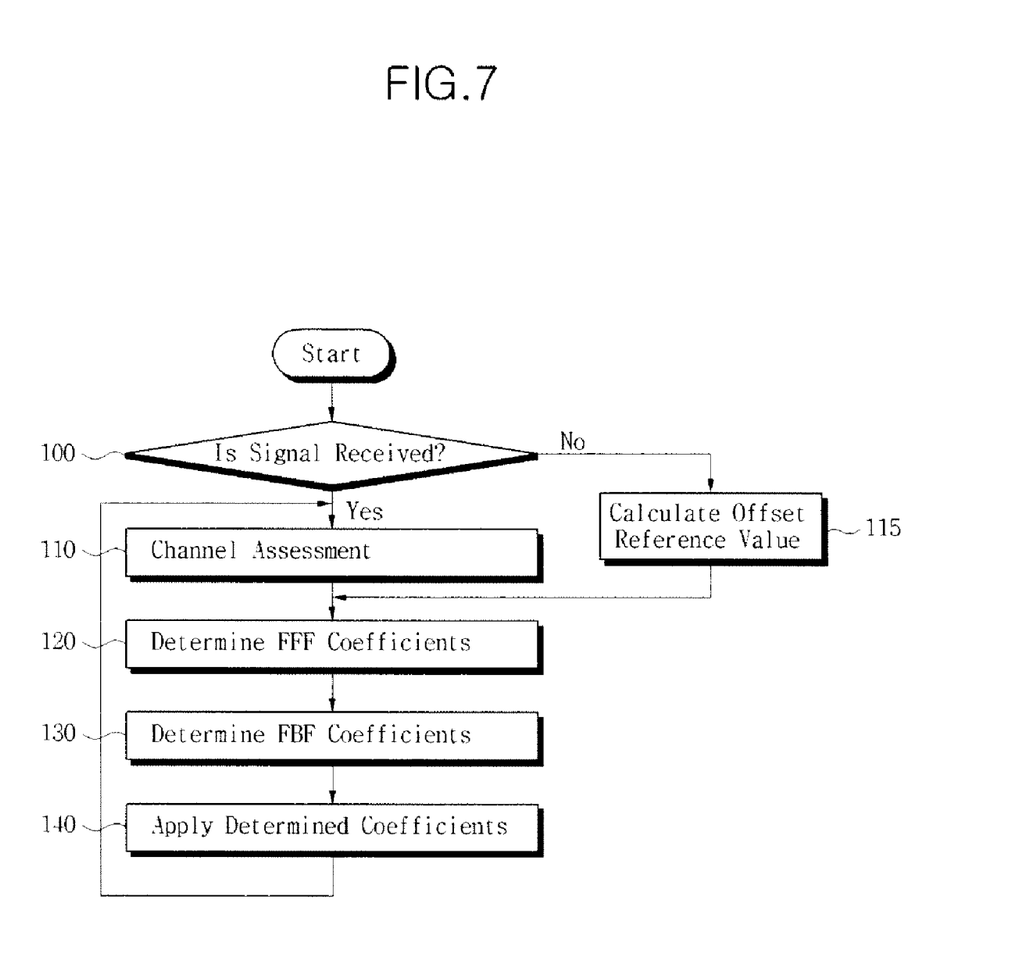
FIG. 7 is a flowchart illustrating an equalization method according to an exemplary embodiment.

FIG. 7 is a flowchart illustrating an equalization method according to an exemplary embodiment.

Referring to FIG. 7, when a signal is received (operation 100), an equalization apparatus according to an exemplary embodiment performs channel assessment on samples of the received signal (operation 110). Here, the channel assessment may be performed based on any received data.

When no signal is received, an offset reference value is calculated (operation 115). When no signal is received, noise components existing in a channel, such as crosstalk noise, return loss, insertion loss, and AWGN, are sampled, and the offset reference value is calculated based on sampled values. That is, a reference voltage having a zero offset is assessed.

In this way, initial DFE coefficients are determined, and subsequent operations are performed using a processor, a digital signal processor (DSP), or other elements of a receiving apparatus.

FFF coefficients are determined based on the result of channel assessment (operation 120). Then, FBF coefficients are determined based on the determined FFF coefficients and the result of channel assessment (operation 130). In the operation (operation 120) of determining the FFF coefficients and the operation (operation 130) of determining the FBF coefficients, the FFF coefficients and the FBF coefficients are determined based on a reference voltage value having a zero offset.

The determined FFF and FBF coefficients are applied to an FFF and an FBF, respectively (operation 140). By using the FFF and the FBF to which the FFF and FBF coefficients are applied, the sampled, received signal is equalized in order to remove channel effects. The coefficients of the FFF and the FBF are continuously reset based on channel assessment. Accordingly, an adaptive equalization method, which reflects channel assessment information in real time, can be provided.

Figure 8:
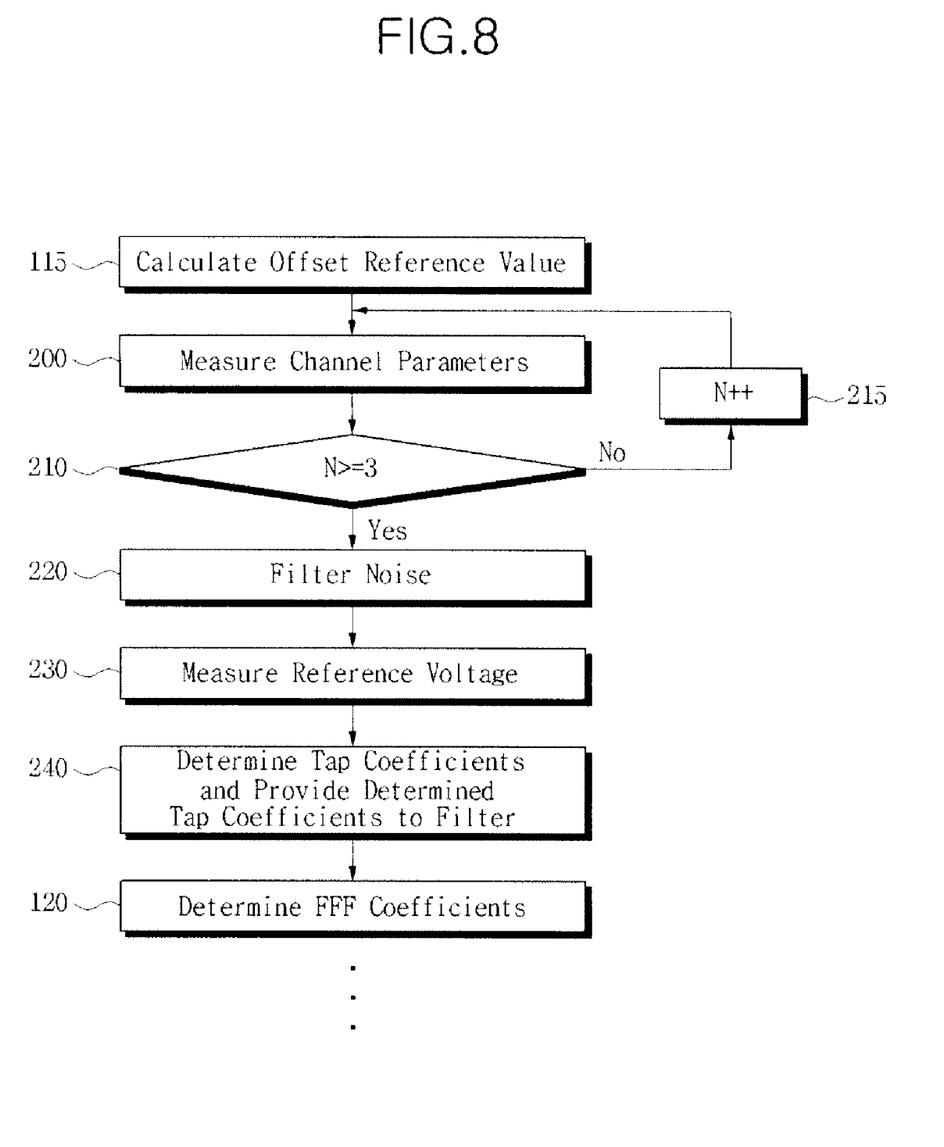
FIG. 8 is a flowchart illustrating zero-offset control according to an exemplary embodiment.

FIG. 8 is a flowchart illustrating zero-offset control according to an exemplary embodiment.

A multi-channel backplane has more factors than only a signal-channel backplane that cause ISI, such as inter-channel crosstalk, interference and return.

Therefore, when no input signal is received, channel parameters for a zero voltage having noise are measured (operation 200). Here, the channel parameters are measured at least three times (operations 210 and 215). When the channel parameters are measured more than three times, channel noise is removed from a reference voltage (operation 220), and a reference voltage value having a zero offset is calculated (operation 230). Tap coefficients are determined based on the calculated reference voltage value, and the determined tap coefficients are provided to an FFF and an FBF (operation 240). In this way, channel parameters are measured a number of times by considering that a multi-channel signal is received, and filter coefficients are measured using a reference voltage value having a zero offset. Consequently, error propagation can be minimized in terms of hardware, which, in turn, makes high-speed equalization possible.

According to the present invention, a response filter, which reduces loss and noise by using AWGN and reducing an error offset, can be used, and the structure of the response filter can be simplified. In addition, channel characteristics are estimated in real time at an initial stage of data transmission and reception. Thus, an equalizer optimized for channel interference characteristics can be designed.

The levels of various kinds of noise formed at a channel input can be minimized through zero-offset control, and a reference voltage is provided. As a result, equalization speed and performance can be enhanced.

Since ISI characteristics resulting from channel impedance discontinuities and channel attenuation can be overcome, reception performance can be improved.

Consequently, degradation of the performance of a receiver can be significantly reduced, and the propagation effect of decision error can be reduced using an initial zero offset function.

The above-described method of compensating a distorted received signal can be written as a computer program. In addition, the computer program can be stored in a computer-readable medium and read and executed by a computer. Examples of the computer readable medium include a magnetic storage medium and an optical recording medium.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in a descriptive sense only and not for purposes of limitation. Therefore, the scope of the invention is defined not by the detailed description of the invention but by the appended claims, and all differences within the scope will be construed as being included in the present invention.

What is claimed is:

1. An decision feedback equalizer (DFE) apparatus for compensating a distorted signal, the apparatus comprising:
    a filter unit removing inter-symbol interference (ISI) from a multi-channel signal that is received; and
    a zero-offset controller identifying a zero offset of the multi-channel signal and determining operating coefficients of the filter unit by reflecting the identified zero offset;
    wherein the filter unit comprises:
        a feed-forward filter (FFF) removing precursor ISI components from the multi-channel signal;
        a feedback filter (FBF) removing postcursor ISI components from the multi-channel signal; and
        a channel assessor which compares characteristics of the multi-channel signal input to the filter with characteristics of the multi-channel signal output from the filter and provides adaptive algorithm information to the zero-offset controller.

2. The apparatus of claim 1, wherein the zero-offset controller identifies the zero offset by reflecting a loss value generated by the filter unit.

3. The apparatus of claim 1, wherein the zero-offset controller identifies a zero offset of a noise signal existing in a channel when no signal is received.

4. The apparatus of claim 1, wherein the zero-offset controller comprises:
    a sampler sampling the multi-channel signal; and
    a coefficient setter setting the operating coefficients of the filter unit based on sampled information.

5. A data receiving apparatus comprising:
    a backplane channel receiving a multi-channel signal; and
    a multi-channel decision feedback equalizer comprising a filter unit which removes ISI from the multi-channel signal received from the backplane channel and a zero-offset controller which identifies a zero offset of the multi-channel signal and determines operating coefficients of the filter unit by reflecting the identified zero offset;
    wherein the filter unit comprises:
        a feed-forward filter (FFF) removing precursor ISI components from the multi-channel signal;
        a feedback filter (FBF) removing postcursor ISI components from the multi-channel signal; and
        a channel assessor which compares characteristics of the multi-channel signal input to the filter with characteristics of the multi-channel signal output from the filter and provides adaptive algorithm information to the zero-offset controller.

6. The apparatus of claim 5, further comprising a clock data recovery (CDR) apparatus recovering clock data.

7. The apparatus of claim 6, wherein the CDR apparatus is located before the multi-channel decision feedback equalizer.

8. The apparatus of claim 6, wherein the CDR apparatus is located after the multi-channel decision feedback equalizer.

9. A computer-implemented decision feedback equalization method of compensating a distorted received signal, the method comprising:
    identifying a zero offset of a multi-channel signal that is received;
    determining operating coefficients by reflecting the identified zero offset; and
    equalizing, in a filter unit, the multi-channel signal based on the determined operating coefficients to remove ISI from the multi-channel signal, the filter unit comprising:
        a feed-forward filter (FFF) removing precursor ISI components from the multi-channel signal;

a feedback filter (FBF) removing postcursor ISI components from the multi-channel signal; and a channel assessor which compares characteristics of the multi-channel signal input to the filter with characteristics of the multi-channel from the filter and provides adaptive algorithm information to a zero-offset controller.

10. The computer-implemented method of claim 9, wherein in the identifying of the zero offset, a zero offset of a noise signal existing in a channel is identified when no signal is received.

11. The computer-implemented method of claim 9, wherein the equalizing of the multi-channel signal in a filter unit comprises:

removing precursor ISI components from the multi-channel signal; and subtracting a feedback error signal from the multi-channel signal with the precursor ISI components removed.

* * * * *